US008945781B2

(12) United States Patent
Chiga et al.

(10) Patent No.: US 8,945,781 B2
(45) Date of Patent: Feb. 3, 2015

(54) NON-AQUEOUS ELECTROLYTE FOR SECONDARY BATTERY AND NON-AQUEOUS ELECTROLYTE SECONDARY BATTERY

(75) Inventors: Takanobu Chiga, Kobe (JP); Keiji Saisho, Kobe (JP); Ryo Mogi, Kurashiki (JP); Osamu Omae, Kurashiki (JP)

(73) Assignees: SANYO Electric Co., Ltd., Moriguchi-shi (JP); Kanto Denka Kogyo Co., Ltd., Tokyo (JP)

( * ) Notice: Subject to any disclaimer, the term of this patent is extended or adjusted under 35 U.S.C. 154(b) by 1001 days.

(21) Appl. No.: 12/522,231

(22) PCT Filed: Feb. 5, 2008

(86) PCT No.: PCT/JP2008/051835
§ 371 (c)(1),
(2), (4) Date: Jul. 6, 2009

(87) PCT Pub. No.: WO2008/102638
PCT Pub. Date: Aug. 28, 2008

(65) Prior Publication Data
US 2010/0081062 A1    Apr. 1, 2010

(30) Foreign Application Priority Data
Feb. 20, 2007 (JP) .................. 2007-038791
Nov. 28, 2007 (WO) ................. PCT/JP2007/072928

(51) Int. Cl.
| H01M 6/16 | (2006.01) |
| H01M 10/0525 | (2010.01) |
| H01M 10/0567 | (2010.01) |
| H01M 10/0569 | (2010.01) |
| H01M 4/131 | (2010.01) |
| H01M 4/133 | (2010.01) |

(52) U.S. Cl.
CPC .. *H01M 10/0525* (2013.01); *H01M 2300/0037* (2013.01); *H01M 2300/0034* (2013.01); *H01M 2300/0028* (2013.01); *H01M 4/131* (2013.01); *H01M 4/133* (2013.01); *H01M 10/0567* (2013.01); *H01M 10/0569* (2013.01); *H01M 2300/004* (2013.01); *Y02E 60/122* (2013.01)
USPC ........... 429/343; 429/341; 429/199; 429/200; 429/330; 429/322; 429/317; 252/62.2

(58) Field of Classification Search
CPC ............... H01M 10/0567; H01M 10/0569; H01M 2300/0028; H01M 2300/0034; H01M 2300/0037; H01M 10/0525; H01M 2300/004; Y02E 60/122
USPC ........ 429/343, 341, 199, 200, 330, 322, 317; 252/62.2
See application file for complete search history.

(56) References Cited

U.S. PATENT DOCUMENTS

| 6,465,135 B1 * | 10/2002 | Nishimura et al. ........... 429/309 |
| 2005/0031963 A1 | 2/2005 | Im et al. |
| 2005/0191553 A1 | 9/2005 | Fujihara et al. |
| 2005/0196670 A1 * | 9/2005 | Yamaguchi et al. .......... 429/200 |

FOREIGN PATENT DOCUMENTS

| CN | 1661846 A | 8/2005 |
| CN | 1846326 A | 10/2006 |
| EP | 1729365 A1 | 12/2006 |
| JP | 6-020719 A | 1/1994 |
| JP | 08-298134 A | 11/1996 |
| JP | 11-086901 A | 3/1999 |
| JP | 2000-106208 A | 4/2000 |
| JP | 2002-100400 A | 4/2002 |
| JP | 2003-100342 | * 4/2003 |
| JP | 2003-282138 A | 10/2003 |
| JP | 2004-095354 A | 3/2004 |
| JP | 2006-032300 | * 2/2006 |
| JP | 2006-032300 A | 2/2006 |
| JP | 2006-172721 A | 6/2006 |
| WO | 2005/091422 A1 | 9/2005 |

OTHER PUBLICATIONS

Notification of Transmittal of Translation of the International Preliminary report on Patentability (Form PCT/IB/338) of International Application No. PCT/JP2008/051835 mailed Oct. 15, 2009 with form PCT/IPEA/409.
Notification of Transmittal of Translation of the International Preliminary Report on Patentability (Form PCT/IB/338) of International Application No. PCT/JP2008/051835 mailed Feb. 5, 2008 with forms PCT/ISA/237, and PCT/IPEA/409.
International Search Report PCT/JP2008/051835, Mailing Date of May 20, 2008.
Chinese Office Action dated Jul. 22, 2011, issued in corresponding Chinese Patent Application No. 200880005250.7.

* cited by examiner

*Primary Examiner* — Laura Weiner
(74) *Attorney, Agent, or Firm* — Westerman, Hattori, Daniels & Adrian, LLP

(57) ABSTRACT

The present invention provides a non-aqueous electrolyte secondary battery wherein a reaction between a non-aqueous electrolyte and an electrode is suppressed and decrease in battery capacity under high temperature is restricted, so that long time excellent battery characteristics can be obtained. A non-aqueous solvent of the non-aqueous electrolyte contains: chain fluorinated carboxylic acid ester represented by the formula R1-$CH_2$—COO—R2 where R1 represents hydrogen or alkyl group and R2 represents alkyl group and the sum of the carbon numbers of R1 and R2 is 3 or less, and in the case that R1 is hydrogen, at least one part of hydrogen in R2 is replaced with fluorine, and, in the case that R1 is alkyl group, at least one part of hydrogen in R1 and/or R2 is replaced with fluorine; and a film forming chemical compound decomposed in the range of +1.0 to 3.0 V based on an equilibrium potential between metal lithium and lithium ion.

16 Claims, 1 Drawing Sheet

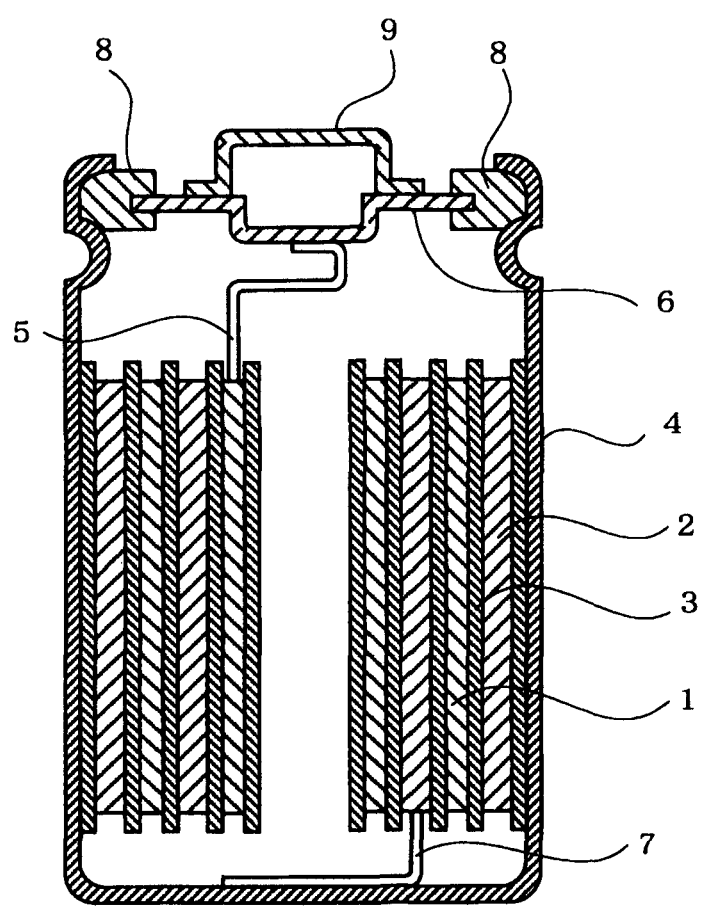

NON-AQUEOUS ELECTROLYTE FOR SECONDARY BATTERY AND NON-AQUEOUS ELECTROLYTE SECONDARY BATTERY

TECHNICAL FIELD

The present invention relates to a non-aqueous electrolyte for a secondary battery and a non-aqueous electrolyte secondary battery employing such a non-aqueous electrolyte and, more particularly to an improved non-aqueous electrolyte which suppresses a reaction between an electrode and itself and restricts decrease in battery capacity under high temperature, so that long time excellent battery characteristics can be obtained.

BACKGROUND ART

In recent years, a non-aqueous electrolyte secondary battery, which employs a non-aqueous electrolyte wherein lithium ion is moved between a positive electrode and a negative electrode to perform charging and discharging, has been widely used as a new type of secondary battery featuring high power and high energy density.

Such a non-aqueous electrolyte secondary battery generally employs a non-aqueous electrolyte comprising a mixed solvent wherein cyclic carbonic acid ester, such as ethylene carbonate, and chain carbonic acid ester, such as diethyl carbonate, ethyl methyl carbonate, and dimethyl carbonate, are mixed in a non-aqueous solvent, and an electrolyte of lithium salt, such as $LiPF_6$ or $LiBF_4$, dissolved in the mixed solvent.

However, the non-aqueous electrolyte secondary battery using the above-described non-aqueous electrolyte has a problem as follows. When a storage test where the non-aqueous electrolyte secondary battery is left in charging condition under high temperature is conducted for evaluating durability, a side reaction wherein the non-aqueous electrolyte reacts with the positive electrode and the negative electrode is caused, and battery capacity is decreased.

Therefore, it has disclosed that a variety of chain fluorinated carboxylic acid ester is used as a non-aqueous solvent of a non-aqueous electrolyte or as an additive to the non-aqueous electrolyte (See patent documents 1-5).

Generally, if the solvent is fluorinated, oxidation-resistance is improved, and as a result, a reaction between a positive electrode and a non-aqueous electrolyte is suppressed. However, if fluorine is introduced, viscosity of the non-aqueous electrolyte is increased, and rise of reactivity with a negative electrode is caused because of lowering of reduction-resistance. Especially, the reactivity with negative electrode is greatly influenced by a position where fluorine is introduced.

However, in each patent document, types of chain fluorinated carboxylic acid ester used are varied. As to the position where carbon is fluorinated, the patent documents 1 and 2 only suggest that hydrogen on α carbon is replaced with fluorine, the patent documents 3 and 4 suggest that any of α carbon and other carbon may be used, and the patent document 5 suggests it is preferable to replace hydrogen on α carbon with fluorine.

Further, if chain fluorinated carboxylic acid ester wherein hydrogen on α carbon is replaced with fluorine, for example, ethyl trifluoroacetate $CF_3COOCH_2CH_3$, is used as the non-aqueous solvent of the non-aqueous electrolyte, lithium salt, such as $LiPF_6$, as electrolyte, is not dissolved properly. If ethyl difluoroacetate $CHF_2COOCH_2CH_3$ is used, although lithium salt, such as $LiPF_6$, as an electrolyte is dissolved, the reactivity with the negative electrode is risen, and battery capacity is greatly decreased and battery characteristics are deteriorated in the case that the non-aqueous electrolyte secondary battery is left in charging condition under high temperature. As a result, the use of chain fluorinated carboxylic acid ester wherein hydrogen on α carbon is replaced with fluorine can not attain sufficient battery characteristics.

Still further, if chain fluorinated carboxylic acid ester wherein hydrogen on carbon which is not α carbon is replaced with fluorine is used as the non-aqueous solvent of the non-aqueous electrolyte, the reactivity with the negative electrode is lowered. However, in the case that the non-aqueous electrolyte secondary battery is left in charging condition under high temperature, there remain problems that the battery capacity is decreased and the battery characteristics are deteriorated. Also, when such a chain fluorinated carboxylic acid ester is used in combination of another non-aqueous solvent, if the non-aqueous solvent to be combined is not appropriate, initial capacity of the non-aqueous electrolyte secondary battery is decreased. Furthermore, in the case that the non-aqueous electrolyte secondary battery is left in charging condition under high temperature, the battery capacity and the battery characteristics are decreased.

As described above, although fluorination of non-aqueous electrolyte contributes to suppression of the reaction between the positive electrode and itself, the reactivity between the negative electrode and itself is increased, so that excellent battery characteristics can not be obtained.

[Patent Document 1] JP-A 8-298134
[Patent Document 2] JP-A 11-86901
[Patent Document 3] JP-A 6-20719
[Patent Document 4] JP-A 2003-282138
[Patent Document 5] JP-A 2006-32300

DISCLOSURE OF THE INVENTION

Problems to be Solved

The invention is directed to solution to the aforementioned problems of the non-aqueous electrolyte secondary battery using the non-aqueous electrolyte. Specifically, it is an object of the invention to provide a non-aqueous electrolyte secondary battery, which suppresses decrease of battery capacity under high temperature by restricting a reaction between a non-aqueous electrolyte and an electrode and maintains favorable battery characteristics for a long period of time.

Solution to the Problems

According to the present invention, a non-aqueous electrolyte for secondary battery prepared by dissolving lithium salt as an electrolyte in a non-aqueous solvent is characterized in that the non-aqueous solvent contains chain fluorinated carboxylic acid ester represented by the below formula (1), and a film forming chemical compound decomposed in the range of +1.0 to 3.0 V based on an equilibrium potential between metal lithium and lithium ion.

$$R1\text{-}CH_2\text{---}COO\text{---}R2 \qquad (1)$$

In the above formula (1), R1 represents hydrogen or alkyl group and R2 represents alkyl group, where the sum of the carbon numbers of R1 and R2 is 3 or less. In the case that R1 is hydrogen, at least one part of hydrogen in R2 is replaced with fluorine, and, in the case that R1 is alkyl group, at least one part of hydrogen in R1 and/or R2 is replaced with fluorine.

Thus, if chain fluorinated carboxylic acid ester wherein the sum of the carbon numbers of R1 and R2 is 3 or less is used, it is recognized that degrade of load characteristics resulting from rise of viscosity of the non-aqueous electrolyte is prevented. Further, chain fluorinated carboxylic acid ester wherein at least one part of hydrogen in R2 is replaced with fluorine in the case that R1 is hydrogen is used. Still further, chain fluorinated carboxylic acid ester wherein at least one part of hydrogen in R1 and/or R2 is replaced with fluorine in the case that R1 is alkyl group is used. In such cases, it is recognized that the above mentioned problems occurred in associated with the use of chain fluorinated carboxylic acid ester wherein hydrogen on α carbon is replaced with fluorine, do not occur.

Examples of usable chain fluorinated carboxylic acid ester may include at least one selected from methyl 3,3,3-trifluoropropionate $CF_3CH_2COOCH_3$ and 2,2,2-trifluoroethyl acetate $CH_3COOCH_2CF_3$. Especially, in the case that the potential of the positive electrode is 4.35 V or more based on metal lithium and graphite material is used for a negative electrode active material, when the battery is charged until a battery voltage becomes 4.25 V or more, methyl 3,3,3-trifluoropropionate $CF_3CH_2COOCH_3$ is preferably used as chain fluorinated carboxylic acid ester.

If the amount of chain fluorinated carboxylic acid ester in the non-aqueous solvent is insufficient, sufficient improvement of the above-described battery characteristics under high temperature is hardly attained. On the other hand, if the above-mentioned amount is excessive, the amount of the film forming chemical compound contained in the non-aqueous electrolyte is decreased, so that a sufficient film is not formed on the negative electrode. Therefore, the amount of chain fluorinated carboxylic acid ester to the whole amount of non-aqueous solvent may preferably be in the range of 5 to 90 volume %, or more preferably be in the range of 20 to 80 volume %.

In the case that the film forming chemical compound which is decomposed in the range of +1.0 to 3.0 V based on the equilibrium potential between metal lithium and lithium ion is contained in the non-aqueous solvent, a decomposition of chain fluorinated carboxylic acid ester resulting from a reaction between the negative electrode and itself is restricted or said chain fluorinated carboxylic acid ester partially contributes to form the film on the negative electrode and suppresses excessive decomposition.

Here, $LiPF_6$ is dissolved in a concentration of 1 mol/l to chain fluorinated carboxylic acid ester such as $CF_3CH_2COOCH_3$ and $CH_3COOCH_2CF_3$, a graphite electrode is employed as a working electrode, and CV measurement is conducted in a condition that sweep rate is 1 mV/sec. In such a case, $CF_3CH_2COOCH_3$ undergoes a reductive decomposition at about +1.2 V based on the equilibrium potential between metal lithium and lithium ion and $CH_3COOCH_2CF_3$ undergoes a reductive decomposition at about +0.8 V based on the equilibrium potential between metal lithium and lithium ion. Therefore, the use of the non-aqueous solvent containing the film forming chemical compound decomposed at +1.0 V or more makes it possible to suppress the decomposition of chain fluorinated carboxylic acid ester resulting from the reaction between the negative electrode and itself or allow chain fluorinated carboxylic acid ester to partially contribute to form the film on the negative electrode. As a result, excessive decomposition of chain fluorinated carboxylic acid ester is suppressed. Further, because the potential of the graphite electrode when the non-aqueous electrolyte is poured thereinto is about +3.0 V, the film forming chemical compound decomposed at +3.0 V or less should be contained.

The use of such a film forming chemical compound makes it possible to suppress the reaction between chain fluorinated carboxylic acid ester and the negative electrode, and the use of such a chain fluorinated carboxylic acid ester as the solvent makes it possible to suppress a reaction between the positive electrode and itself. As a result, favorable battery characteristics can be obtained.

Examples of usable film forming chemical compound include at least one type selected from 4-fluoroethylene carbonate and its derivatives, ethylene sulfite and its derivatives, vinyl ethylene carbonate and its derivatives, $LiB(C_2O_4)_2$ and $LiBF_2(C_2O_4)$. Especially, 4-fluoroethylene carbonate, which makes a suitable film on the negative electrode and has effective function as the non-aqueous solvent, is preferably used. Each of decomposition potentials of 4-fluoroethylene carbonate, ethylene sulfite, vinyl ethylene carbonate, $LiB(C_2O_4)_2$, and $LiBF_2(C_2O_4)$ are about 1.2 V, about 1.1 V, about 1.3 V, about 2.0 V and about 1.7 V based on the equilibrium potential between metal lithium and lithium ion. Further, among the derivatives, 4-fluoroethylene carbonate derivatives, ethylene sulfite derivatives and vinyl ethylene carbonate derivatives, which have the decomposition potential in the range of +1.0 V to +3.0 V, preferably in the range of +1.1 V to 2.0 V, may be used.

In the case where 4-fluoroethylene carbonate is contained as the film forming chemical compound in the non-aqueous solvent, if the amount of 4-fluoroethylene carbonate is insufficient, a sufficient film is not formed on the negative electrode, and reductive decomposition of chain fluorinated carboxylic acid ester is caused. As a result, in the case that the non-aqueous electrolyte secondary battery is left in charging condition under high temperature, storage properties are degraded. On the other hand, if the amount of 4-fluoroethylene carbonate is excessive, viscosity of the non-aqueous electrolyte rises and load characteristics are decreased. Therefore, the amount of 4-fluoroethylene carbonate to the whole amount of non-aqueous solvent may preferably be in the range of 2 to 40 volume %, or more preferably be in the range of 5 to 30 volume %.

In the case that ethylene sulfite and its derivatives and/or vinyl ethylene carbonate and its derivatives are used as the film forming chemical compound, its amount to the whole amount of the non-aqueous electrolyte containing electrolyte may preferably be in the range of 0.1 to 10 weight %, more preferably be in the range of 0.2 to 5 weight %. In the case that lithium salt such as $LiB(C_2O_4)_2$ and $LiBF_2(C_2O_4)$ is used as the film forming chemical compound, its amount to the non-aqueous solvent may preferably be in the range of 0.01 to 0.4 mol/l, more preferably be in the range of 0.05 to 0.2 mol/l. These ranges are determined by the following reason. If the amount of the film forming chemical compound is smaller than the above defined range, the sufficient film is not formed on the negative electrode. As a result, the reductive decomposition of chain fluorinated carboxylic acid ester is caused, and favorable storage properties in charging condition under high temperature can not be obtained. On the other hand, if the amount of the film forming chemical compound is larger than the above defined range, the decomposition of the film forming chemical compound occurs often, and there is a fear that increment of inner resistance and generation of gas are caused.

In the non-aqueous electrolyte secondary battery, another non-aqueous solvent may be added in addition to said chain fluorinated carboxylic acid ester and said film forming chemical compound. Favorable Examples of such an usable non-aqueous solvent include dimethyl carbonate $CH_3OCOOCH_3$, ethyl methyl carbonate $CH_3OCOOC_2H_5$, diethyl carbonate $C_2H_5OCOOC_2H_5$, methyl acetate $CH_3COOCH_3$, methyl propionate $C_2H_5COOCH_3$, and ethyl acetate $CH_3COOC_2H_5$. Especially, addition of at least one type of low viscosity solvent selected from methyl acetate, methyl propionate, ethyl acetate, and dimethyl carbonate is favorable to lower viscosity of the non-aqueous electrolyte for improvement of load characteristics. Furthermore, a mixture of ethylene carbonate, propylene carbonate, and γ-butyrolactone, which are high permittivity solvent, may be used to enhance conductivity of the non-aqueous electrolyte.

Further, as the electrolyte of lithium salt to be dissolved in the non-aqueous solvent of the non-aqueous electrolyte secondary battery, in addition to $LiB(C_2O_4)_2$ and $LiBF_2(C_2O_4)$, lithium salt which has been generally used may be employed. Examples of usable lithium salt include $LiPF_6$, $LiBF_4$, $LiCF_3SO_3$, $LiClO_4$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$. Especially, it is preferable to use $LiPF_6$, $LiBF_4$, and $LiN(CF_3SO_2)_2$.

In the non-aqueous electrolyte secondary battery according to the present invention, the non-aqueous electrolyte for secondary battery prepared as described above is used as the non-aqueous electrolyte.

In the non-aqueous electrolyte secondary battery according to the present invention, any known material capable of storing and releasing lithium and having a high electric potential may be used as positive electrode active material for the positive electrode. For example, lithium-transition metal oxide having layer structure, spinel structure or olivin structure may be used alone or in combination of two or more. Especially, lithium-transition metal oxide having layer structure is preferably used to obtain a non-aqueous electrolyte secondary battery with high energy density. For example, it is preferable to use lithium-transition metal oxide such as lithium-cobalt oxide, lithium-cobalt-nickel-manganese oxide or lithium-cobalt-nickel-aluminum oxide. Especially, in the viewpoint of stability of crystal structure, lithium cobaltate incorporating Al or Mg in its crystal inside and adhering Zr to its particle surface, is preferably used.

In the non-aqueous electrolyte secondary battery according to the present invention, any known material capable of storing and releasing lithium may be used as negative electrode active material for the negative electrode. Examples of usable negative electrode active material include lithium alloy, carbon material, and metal oxide. Specifically, examples of usable lithium alloy include lithium metal, lithium-aluminum alloy, lithium-lead alloy, lithium-silicon alloy and lithium-tin alloy. Examples of usable carbon material include graphite, cokes and baked organic materials. As the metal oxide, $SnO_2$, $SnO$, and $TiO_2$, which is the metal oxide having a lower potential than that of positive electrode active material, is used. Especially, the carbon material of graphite, which has small volume change associated with storing and releasing of lithium and is excellent in reversibility, is preferably used.

Effect of the Invention

In the non-aqueous electrolyte for secondary battery according to the present invention, as the non-aqueous solvent dissolving lithium salt of electrolyte, a non-aqueous solvent comprising chain fluorinated carboxylic acid ester represented by the above formula (1) and film forming chemical compound decomposed in the range of +1.0 to 3.0 V based on the equilibrium potential between metal lithium and lithium ion is used.

In the non-aqueous electrolyte secondary battery using the above-described non-aqueous electrolyte, the film forming chemical compound contributes to form a suitable film on the negative electrode and the decomposition of chain fluorinated carboxylic acid ester is suppressed. As a result, decrease of the battery capacity is restricted even under high temperature and favorable battery characteristics can be obtained.

EXAMPLES

A non-aqueous electrolyte secondary battery using a non-aqueous electrolyte for secondary battery according to the invention will hereinbelow be described in detail by way of examples thereof. In addition, comparative examples are also cited to clarify that the non-aqueous electrolyte secondary battery according to the examples of the invention shows improved storage properties under high temperature with higher capacity.

Example 1

In Example 1, a cylinder-shaped non-aqueous electrolyte secondary battery as illustrated in FIG. 1 was fabricated using a positive electrode, a negative electrode, and a non-aqueous electrolyte that were prepared in the following manner. The non-aqueous electrolyte secondary battery had a charge cut-off voltage of 4.2 V and a nominal capacity of 2300 mAh.

[Preparation of Positive Electrode]

A positive electrode was prepared as follows. A solid solution prepared by doping 1.0 mol % of Al and 1.0 mol % of Mg in lithium cobaltate $LiCoO_2$ and adding 0.05 mol % of Zr to its particle surface was used as a positive electrode active material.

The positive electrode active material, carbon as a conductive agent, and polyvinylidene fluoride as a binder were weighed out in a weight ratio of 95:2.5:2.5. These materials were blended with N-methyl-2-pyrrolidone solution to give positive electrode slurry. The resultant slurry was applied to both sides of an aluminum foil as a current collector and dried. Subsequently, the electrode was rolled to prepare a positive electrode.

[Preparation of Negative Electrode]

A negative electrode was prepared as follows.

Graphite as a negative electrode active material, styrene-butadiene rubber as a binder, and carboxymethylcellose as a viscosity improver were weighed out in a weight ratio of 97.5:1.5:1. These materials were blended with an aqueous solution to give negative electrode slurry. The resultant slurry was applied to both sides of a copper foil as a current collector and dried. Subsequently, the electrode was rolled to prepare a negative electrode.

[Preparation of Non-Aqueous Electrolyte]

A non-aqueous electrolyte was prepared as follows. As a non-aqueous solvent, a mixed solvent is prepared by blending 4-fluoroethylene carbonate (4-FEC) which decomposes in the range of +1.0 to 3.0 V based on an equilibrium potential between metal lithium and lithium ion as a film forming chemical compound with $CF_3CH_2COOCH_3$ as chain fluorinated carboxylic acid ester which is represented by the above formula (1) at a volume ratio of 2:8. Then, lithium hexafluorophosphate $LiPF_6$ was dissolved as an electrolyte in a concentration of 1 mol/l to the mixed solvent. Thus was prepared the non-aqueous electrolyte.

The following is a method of synthesizing methyl 3,3,3-trifluoropropionate $CF_3CH_2COOCH_3$ used as chain fluorinated carboxylic acid ester described above.

35 g (350 mmol) of diisopropylamine and 300 ml of tetrahydrofuran were poured to a Kjeldahl flask of 1 liter, ice-cooled and stirred while gradually dropping 219 ml (350 mmol) of 1.6 M normal butyl lithium/hexane. The resultant mixture solution was stirred for 30 minutes at room temperature to prepare lithium diisopropylamide solution. The resultant lithium diisopropylamide solution was cooled to −80° C. while dropping 26 g (350 mmol) of methyl acetate gradually and matured for 15 minutes. After that, 38 g (350 mmol) of chlorotrimethylsilane was added and quenched, and the resultant mixture solution was stirred at room temperature for one night. Further, solid thus generated was removed by filtration and yellow oil obtained by distilling the solvent was dissolved in 200 ml of normal hexane and cooled to −78° C. Then, 70 g (360 mmol) of iodotrifluoro methane was added thereto while stirring. Further, 10 ml (10 mmol) of 1M triethylborane/hexane was added and the temperature was risen to the room temperature within about 2 hours. Subsequently, after 200 ml of water was added and quenched, an organic phase was separated by a separatory funnel and dried using magnesium sulfate. Thereafter, purification by distilling was conducted to obtain 10 g of methyl 3,3,3-trifluoropropionate of which yield was 20%.

A non-aqueous electrolyte secondary battery of Examples was fabricated as follows. As illustrated in FIG. 1, as a separator 3 a fine porous film made of polyethylene having lithium-ion mobility was interposed between a positive electrode 1 and a negative electrode 2, that were prepared in the above-described manner, and these components were spirally coiled and accommodated in a battery case 4. Then, the non-aqueous electrolyte prepared as above was poured into the battery case 4 and the battery case 4 was sealed. The positive electrode 1 was connected to a positive electrode external terminal 9 attached to a positive electrode cap 6 via a positive electrode tab 5, while the negative electrode 2 was connected to the battery case 4 via a negative electrode tab 7. The battery case 4 and the positive electrode cap 6 were electrically insulated with an insulative packing 8.

Example 2

In Example 2, a mixed solvent as the non-aqueous solvent of the non-aqueous electrolyte was prepared as follows. The foregoing 4-fluoroethylene carbonate (4-FEC) used in Example 1 as film forming chemical compound was blended with $CH_3COOCH_2CF_3$ as chain fluorinated carboxylic acid ester represented by the above formula (1) at a volume ratio of 2:8. Thus, except for the non-aqueous solvent, a non-aqueous electrolyte secondary battery of Example 2 was fabricated in the same manner as in Example 1.

The following is a method of synthesizing 2,2,2-trifluoroethyl acetate $CH_3COOCH_2CF_3$ used as chain fluorinated carboxylic acid ester described above.

85 g (0.85 mol) of trifluoroethanol and 80 ml of diethyl ether were poured to a separable flask of 1 liter, and further 129 g (1.27 mol/1.5 eq) of triethylamine was added thereto. Then, the resultant mixture was ice-cooled and stirred while dropping a solution diluting 100 g (1.27 mol/1.5 eq) of acetyl chloride with 80 ml of diethyl ether by dropping funnel. While dropping, the temperature of the solution was kept between 27° C. and 35° C. The period of time for dropping was 20 minutes. After that, the resultant mixed solution was stirred for 1.5 hours at room temperature and 350 ml of water was added, then, the reaction was completed. Subsequently, an organic phase was separated by the reparatory funnel and dried using magnesium sulfate. Thereafter, purification by distilling was conducted to obtain 88 g of 2,2,2-trifluoroethyl acetate of which yield was 73%.

Example 3

In Example 3, a mixed solvent as the non-aqueous solvent of the non-aqueous electrolyte was prepared as follows. The foregoing 4-fluoroethylene carbonate (4-FEC) used in Example 1 as film forming chemical compound was blended with $CF_3CH_2COOCH_3$ as chain fluorinated carboxylic acid ester represented by the above formula (1) at a volume ratio of 1:9. Except for the non-aqueous solvent, a non-aqueous electrolyte secondary battery of Example 3 was fabricated in the same manner as in Example 1.

Example 4

In Example 4, a mixed solvent as the non-aqueous solvent of the non-aqueous electrolyte was prepared as follows. The foregoing 4-fluoroethylene carbonate (4-FEC) used in Example 1 as film forming chemical compound was blended with $CF_3CH_2COOCH_3$ as chain fluorinated carboxylic acid ester represented by the above formula (1) at a volume ratio of 3:7. Except for the non-aqueous solvent, a non-aqueous electrolyte secondary battery of Example 4 was fabricated in the same manner as in Example 1.

Example 5

In Example 5, a mixed solvent as the non-aqueous solvent of the non-aqueous electrolyte was prepared as follows. The foregoing 4-fluoroethylene carbonate (4-FEC) used in Example 1 as film forming chemical compound, $CF_3CH_2COOCH_3$ as chain fluorinated carboxylic acid ester represented by the above formula (1), and dimethyl carbonate (DMC) were blended at a volume ratio of 2:4:4. Except for the non-aqueous solvent, a non-aqueous electrolyte secondary battery of Example 5 was fabricated in the same manner as in Example 1.

Example 6

In Example 6, a mixed solvent as the non-aqueous solvent of the non-aqueous electrolyte was prepared as follows. The foregoing 4-fluoroethylene carbonate (4-FEC) used in Example 1 as film forming chemical compound, $CF_3CH_2COOCH_3$ as chain fluorinated carboxylic acid ester represented by the above formula (1), and methyl propionate $CH_3CH_2COOCH_3$ of chain carboxylic acid ester which was not fluorinated were blended at a volume ratio of 2:4:4. Except for the non-aqueous solvent, a non-aqueous electrolyte secondary battery of Example 6 was fabricated in the same manner as in Example 1.

Comparative Example 1

In Comparative Example 1, as the non-aqueous solvent, a mixed solvent was prepared by blending ethylene carbonate (EC) with ethyl methyl carbonate (EMC) at a volume ratio of 3:7. Then, lithium hexafluorophosphate $LiPF_6$ was dissolved as an electrolyte in a concentration of 1 mol/l to the mixed solvent, and 2 weight % vinylene carbonate (VC) was further added thereto. Thus, a non-aqueous electrolyte was prepared. A non-aqueous electrolyte secondary battery of Comparative Example 1 was fabricated in the same manner as in Example 1 except for the non-aqueous electrolyte.

Comparative Example 2

In Comparative Example 2, a mixed solvent as the non-aqueous solvent of the non-aqueous electrolyte was prepared as follows. The foregoing 4-fluoroethylene carbonate (4-FEC) used in Example 1 as film forming chemical compound was blended with methyl propionate $CH_3CH_2COOCH_3$ of chain carboxylic acid ester which was not fluorinated at a volume ratio of 2:8. A non-aqueous electrolyte secondary battery of Comparative Example 2 was fabricated in the same manner as in Example 1 except for the non-aqueous solvent.

Comparative Example 3

In Comparative Example 3, a mixed solvent as the non-aqueous solvent of the non-aqueous electrolyte was prepared as follows. The foregoing 4-fluoroethylene carbonate (4-FEC) used in Example 1 as film forming chemical compound was blended with $CH_3COOCH_2CH_3$ of chain carboxylic acid ester which was not fluorinated at a volume ratio of 2:8. A non-aqueous electrolyte secondary battery of Comparative Example 3 was fabricated in the same manner as in Example 1 except for the non-aqueous solvent.

Comparative Example 4

In Comparative Example 4, a mixed solvent as the non-aqueous solvent of the non-aqueous electrolyte was prepared as follows. The foregoing 4-fluoroethylene carbonate (4-FEC) used in Example 1 as film forming chemical compound was blended with $CHF_2COOCH_2CH_3$ of chain carboxylic acid ester wherein hydrogen on α carbon was replaced with fluorine at a volume ratio of 2:8. A non-aqueous electrolyte secondary battery of Comparative Example 4 was fabricated in the same manner as in Example 1 except for the non-aqueous solvent.

Comparative Example 5

In Comparative Example 5, a mixed solvent as the non-aqueous solvent of the non-aqueous electrolyte was prepared as follows. The foregoing 4-fluoroethylene carbonate (4-FEC) used in Example 1 as film forming chemical compound was blended with $CHF_2COOCH_3$ of chain carboxylic acid ester wherein hydrogen on α carbon was replaced with fluorine, at a volume ratio of 2:8. A non-aqueous electrolyte secondary battery of Comparative Example 5 was fabricated in the same manner as in Example 1 except for the non-aqueous solvent.

Comparative Example 6

In Comparative Example 6, a mixed solvent as the non-aqueous solvent of the non-aqueous electrolyte was prepared as follows. Ethylene carbonate having decomposition potential of 0.6 V being out of the range of +1.0 to 3.0 V based on the equilibrium potential between metal lithium and lithium ion was blended with $CF_3CH_2COOCH_3$ as chain fluorinated carboxylic acid ester represented by the above formula (1) at a volume ratio of 2:8. A non-aqueous electrolyte secondary battery of Comparative Example 6 was fabricated in the same manner as in Example 1 except for the non-aqueous solvent.

Comparative Example 7

In Comparative Example 7, a mixed solvent as the non-aqueous solvent of the non-aqueous electrolyte was prepared as follows. Ethylene carbonate having decomposition potential of 0.6 V being out of the range of +1.0 to 3.0 V based on the equilibrium potential between metal lithium and lithium ion was blended with $CH_3COOCH_2CF_3$ as chain fluorinated carboxylic acid ester represented by the above formula (1) at a volume ratio of 2:8. A non-aqueous electrolyte secondary battery of Comparative Example 7 was fabricated in the same manner as in Example 1 except for the non-aqueous solvent.

Next, each of the non-aqueous electrolyte secondary batteries of Examples 1 to 6 and Comparative Examples 1 to 7 was charged at a constant current of 460 mA at 25° C. until a voltage became 4.2 V. Further, each of the non-aqueous electrolyte secondary batteries was charged at a constant voltage of 4.2 V until a current became 46 mA and discharged at the constant current of 460 mA until the voltage became 2.75 V to measure an initial discharge capacity. Each initial discharge capacity of each non-aqueous electrolyte secondary battery was determined with respect to the initial discharge capacity of Comparative Example 1, which was taken as 100. The results are shown in Table 1 below. In Table 1, each material is abbreviated as follows, 4-fluoroethylene carbonate is as 4-FEC, dimethyl carbonate is as DMC, ethylene carbonate is as EC, ethyl methyl carbonate is as EMC, and vinylene carbonate is as VC.

TABLE 1

| | Non-Aqueous Solvent (volume ratio) | Initial Discharge Capacity |
|---|---|---|
| Example 1 | 4-FEC:$CF_3CH_2COOCH_3$ (2:8) | 98 |
| Example 2 | 4-FEC:$CH_3COOCH_2CF_3$ (2:8) | 99 |
| Example 3 | 4-FEC:$CF_3CH_2COOCH_3$ (1:9) | 100 |
| Example 4 | 4-FEC:$CF_3CH_2COOCH_3$ (3:7) | 100 |
| Example 5 | 4-FEC:$CF_3CH_2COOCH_3$:DMC (2:4:4) | 99 |
| Example 6 | 4-FEC:$CF_3CH_2COOCH_3$:$CH_3CH_2COOCH_3$ (2:4:4) | 99 |
| Comp. Ex. 1 | EC:EMC(3:7) + VC (2 wt %) | 100 |
| Comp. Ex. 2 | 4-FEC:$CH_3CH_2COOCH_3$ (2:8) | 101 |
| Comp. Ex. 3 | 4-FEC:$CH_3COOCH_2CH_3$ (2:8) | 100 |
| Comp. Ex. 4 | 4-FEC:$CHF_2COOCH_2CH_3$ (2:8) | 96 |
| Comp. Ex. 5 | 4-FEC:$CHF_2COOCH_3$ (2:8) | 93 |
| Comp. Ex. 6 | EC:$CF_3CH_2COOCH_3$ (2:8) | 87 |
| Comp. Ex. 7 | EC:$CH_3COOCH_2CF_3$ (2:8) | 86 |

As is apparent from the results, each of the non-aqueous electrolyte secondary batteries of Comparative Examples 6 and 7 utilizing the mixed solvent wherein $CF_3CH_2COOCH_3$ or $CH_3COOCH_2CF_3$ as chain fluorinated carboxylic acid ester represented by the above formula (1) is mixed with ethylene carbonate having decomposition potential of 0.6 V which is out of the range of +1.0 to 3.0 V based on the equilibrium potential between metal lithium and lithium ion, exhibited a great decrease in initial discharge capacity, as compared with each of the non-aqueous electrolyte secondary batteries of Examples 1 to 6 and Comparative Examples 1 to 5.

Next, each of the non-aqueous electrolyte secondary batteries of Examples 1 to 6 and Comparative Examples 1 to 7 was charged at the constant current of 460 mA at 25° C. until a voltage became 4.2 V. Further, each of the non-aqueous electrolyte secondary batteries was charged at the constant voltage of 4.2 V until a current became 46 mA and discharged at the constant current of 460 mA until the voltage became 2.75 V to measure discharge capacity $D_1$ before storage.

Then, each of the non-aqueous electrolyte secondary batteries was charged at a constant current of 2300 mA at 25° C. until the voltage became 4.2 V. Further, each of the non-aqueous electrolyte secondary batteries was charged at the constant voltage of 4.2 V until the current became 46 mA. In such a condition, each of the batteries was preserved in a climate chamber at 60° C. for 10 days. After that, each of the batteries after storage was discharged at the constant current of 460 mA at 25° C. until the voltage became 2.75 V to measure residual capacity $D_2$ after storage.

Subsequently, each of the non-aqueous electrolyte secondary batteries was charged at the constant current of 460 mA at 25° C. until the voltage became 4.2 V. Further, each of the non-aqueous electrolyte secondary batteries was charged at the constant voltage of 4.2 V until the current became 46 mA and discharged at the constant current of 460 mA until the voltage became 2.75 V to measure recovery capacity $D_3$ after storage.

Then, as to each of the non-aqueous electrolyte secondary batteries of Examples 1 to 6 and Comparative Examples 1 to 7 after storage, discharge capacity $D_1$ before storage, residual capacity $D_2$ after storage and recovery capacity $D_3$ after storage, which were obtained as described above were applied to the following equation to find percentage of residual capacity (%) and percentage of recovery capacity (%). The results were shown in Table 2 below.

Percentage of residual capacity (%)=$(D_2/D_1) \times 100$

Percentage of recovery capacity (%)=$(D_3/D_1) \times 100$

TABLE 2

|  | Non-Aqueous Solvent (volume ratio) | Percentage of Residual Capacity (%) | Percentage of Recovery Capacity (%) |
|---|---|---|---|
| Ex. 1 | 4-FEC:$CF_3CH_2COOCH_3$ (2:8) | 90 | 94 |
| Ex. 2 | 4-FEC:$CH_3COOCH_2CF_3$ (2:8) | 90 | 94 |
| Ex. 3 | 4-FEC:$CF_3CH_2COOCH_3$ (1:9) | 89 | 93 |
| Ex. 4 | 4-FEC:$CF_3CH_2COOCH_3$ (3:7) | 90 | 94 |
| Ex. 5 | 4-FEC:$CF_3CH_2COOCH_3$:DMC (2:4:4) | 89 | 94 |
| Ex. 6 | 4-FEC:$CF_3CH_2COOCH_3$:$CH_3CH_2COOCH_3$ (2:4:4) | 85 | 94 |
| Comp. Ex. 1 | EC:EMC(3:7) + VC (2 wt %) | 83 | 93 |
| Comp. Ex. 2 | 4-FEC:$CH_3CH_2COOCH_3$ (2:8) | 83 | 92 |
| Comp. Ex. 3 | 4-FEC:$CH_3COOCH_2CH_3$ (2:8) | 82 | 89 |
| Comp. Ex. 4 | 4-FEC:$CHF_2COOCH_2CH_3$ (2:8) | 1 | 14 |
| Comp. Ex. 5 | 4-FEC:$CHF_2COOCH_3$ (2:8) | 1 | 17 |
| Comp. Ex. 6 | EC:$CF_3CH_2COOCH_3$ (2:8) | 71 | 87 |
| Comp. Ex. 7 | EC:$CH_3COOCH_2CF_3$ (2:8) | 54 | 63 |

According to the result of comparison, each of the non-aqueous electrolyte secondary batteries of Examples 1 to 6 exhibited obvious improvement in both of percentage of residual capacity and percentage of recovery capacity after storage as compared with each of Comparative Examples 2 and 3, Comparative Examples 6 and 7, and Comparative Example 1. Here, the batteries of Examples 1 to 6 utilized the mixed solvent containing chain fluorinated carboxylic acid ester represented by the above formula (1) and film forming chemical compound having decomposition potential of the range of +1.0 to 3.0 V based on the equilibrium potential between metal lithium and lithium ion, the batteries of Comparative Examples 2 and 3 utilized the mixed solvent containing chain carboxylic acid ester which was not fluorinated, the batteries of Comparative Examples 6 and 7 utilized the mixed solvent containing ethylene carbonate having decomposition potential being out of the range of +1.0 to 3.0 V based on the equilibrium potential between metal lithium and lithium ion, and the battery of Comparative Example 1 utilized the conventional solvent wherein vinylene carbonate is added to the mixed solvent of ethylene carbonate and ethyl methyl carbonate.

Further, each of the non-aqueous electrolyte secondary batteries of Comparative Examples 4 and 5 utilizing chain fluorinated carboxylic acid ester of $CHF_2COOCH_2CH_3$ or $CHF_2COOCH_3$ where in hydrogen on α carbon was replaced with fluorine exhibited great decrease in both of percentage of residual capacity and percentage of recovery capacity after storage. This is thought to be a result from a reaction between the non-aqueous electrolyte and the negative electrode caused by decrease of electron density of carbonyl carbon being next to α carbon by combining α carbon with fluorine having high electron-withdrawing property.

Example 7

In Example 7, as the non-aqueous solvent contained in the non-aqueous electrolyte, a mixed solvent was prepared by blending the foregoing 4-fluoroethylene carbonate (4-FEC) used in Example 1 as film forming chemical compound, propylene carbonate (PC), and $CF_3CH_2COOCH_3$ as chain fluorinated carboxylic acid ester represented by the above formula (1) at a volume ratio of 20:5:75. Further, lithium hexafluorophosphate $LiPF_6$ as an electrolyte was dissolved in the mixed solvent in a concentration of 1.1 mol/l. Except for the non-aqueous solvent, a non-aqueous electrolyte secondary battery of Example 7 was fabricated in the same manner as in Example 1, which was cylinder-shaped as illustrated in FIG. 1, and had a charge cut-off voltage of 4.3 V and a nominal capacity of 2700 mAh.

Example 8

In Example 8, as the non-aqueous solvent contained in the non-aqueous electrolyte, a mixed solvent was prepared by blending the foregoing 4-fluoroethylene carbonate (4-FEC) used in Example 1 as film forming chemical compound, propylene carbonate (PC), and $CH_3COOCH_2CF_3$ as chain fluorinated carboxylic acid ester represented by the above formula (1) at a volume ratio of 20:5:75. Further, lithium hexafluorophosphate $LiPF_6$ as an electrolyte was dissolved in the mixed solvent in a concentration of 1.1 mol/l. Except for the non-aqueous solvent, a non-aqueous electrolyte secondary battery of Example 8 was fabricated in the same manner as in Example 1, which was cylinder-shaped and had a charge cut-off voltage of 4.3 V and a nominal capacity of 2700 mAh as the same as the non-aqueous electrolyte secondary battery of Example 7.

Comparative Example 8

In Comparative Example 8, as the non-aqueous solvent contained in the non-aqueous electrolyte, a mixed solvent was prepared by blending the foregoing 4-fluoroethylene carbonate (4-FEC) used in Example 1 as film forming chemical compound, propylene carbonate (PC) and ethyl methyl carbonate (EMC) at a volume ratio of 20:5:75. Further, lithium hexafluorophosphate $LiPF_6$ as an electrolyte was dissolved in the mixed solvent in a concentration of 1.1 mol/l. Except for the non-aqueous solvent, a non-aqueous electrolyte secondary battery of Comparative Example 8 was fabricated in the same manner as in Example 1, which was cylinder-shaped and had a charging cut-off voltage of 4.3 V and a nominal capacity of 2700 mAh as the same as the non-aqueous electrolyte secondary batteries of Examples 7 and 8.

Next, each of the non-aqueous electrolyte secondary batteries of Examples 7, 8 and Comparative Example 8 was charged at a constant current of 1000 mA at 25° C. until a voltage became 4.3 V. Further, each of the non-aqueous electrolyte secondary batteries was charged at a constant voltage of 4.3 V until a current became 54 mA and discharged at a constant current of 540 mA until the voltage became 3.0 V to measure initial discharge capacity. Each initial discharge capacity of each battery was determined with respect to the initial discharge capacity of Comparative Example 8, which was taken as 100. The results are shown in Table 3 below.

TABLE 3

| | Non-Aqueous Solvent (volume ratio) | Initial Discharge Capacity |
|---|---|---|
| Example 7 | 4-FEC:PC:$CF_3CH_2COOCH_3$ (20:5:75) | 99 |
| Example 8 | 4-FEC:PC:$CH_3COOCH_2CF_3$ (20:5:75) | 99 |
| Comparative Example 8 | 4-FEC:PC:EMC (20:5:75) | 100 |

As is apparent from Table 3, almost same initial discharge capacity was obtained in each of the non-aqueous electrolyte secondary batteries of Examples 7, 8 and Comparative Example 8.

Next, each of the non-aqueous electrolyte secondary batteries of Examples 7, 8 and Comparative Example 8 was charged at the constant current of 1000 mA at 25° C. until a voltage became 4.3 V. Further, each of the non-aqueous electrolyte secondary batteries was charged at the constant voltage of 4.3 V until a current became 54 mA and discharged at a constant current of 2700 mA until the voltage became 3.0V to measure discharge capacity $D_1$ before storage.

Then, each of the non-aqueous electrolyte secondary batteries of Examples 7, 8 and Comparative Example 8 was charged at the constant current of 1000 mA at 25° C. until the voltage became 4.3 V. Further, each of the non-aqueous electrolyte secondary batteries was charged at the constant voltage of 4.3 V until the current became 54 mA. In such a condition, each of the batteries was preserved in a climate chamber at 60° C. for 20 days.

Then, each of the non-aqueous electrolyte secondary batteries of Examples 7, 8 and Comparative Example 8 was measured of battery voltage, and the result of change of voltage was shown in Table 4 below.

After that, each of the non-aqueous electrolyte batteries after storage was discharged at the constant current of 2700 mA at 25° C. until the voltage became 3.0 V to measure residual capacity $D_2$ after storage.

Subsequently, each of the non-aqueous electrolyte secondary batteries was charged at the constant current of 1000 mA at 25° C. until the voltage became 4.3 V. Further, each of the non-aqueous electrolyte secondary batteries was charged at the constant voltage of 4.3 V until the current became 54 mA and discharged at the constant current of 2700 mA until the voltage became 3.0 V to measure recovery capacity $D_3$ after storage.

Then, as the same as each of the non-aqueous electrolyte secondary batteries of Examples 1 to 6 and Comparative Examples 1 to 7, each of the non-aqueous electrolyte secondary batteries of Examples 7, 8 and Comparative Example 8 after storage was measured of percentage of residual capacity (%) and percentage of recovery capacity (%) by using the above equation. In the equation, discharge capacity $D_1$ before storage, residual capacity $D_2$ after storage and recovery capacity $D_3$ after storage which were obtained as described above were applied. The results were shown in Table 4 below.

TABLE 4

| | Non-Aqueous Solvent | Change of Voltage (V) | Percentage of Residual Capacity (%) | Percentage of Recovery Capacity (%) |
|---|---|---|---|---|
| Ex. 7 | 4-FEC:PC:$CF_3CH_2COOCH_3$ (20:5:75) | 4.28→4.19 | 82 | 89 |
| Ex. 8 | 4-FEC:PC:$CH_3COOCH_2CF_3$ (20:5:75) | 4.28→4.18 | 76 | 85 |
| Comp. Ex. 8 | 4-FEC:PC:EMC (20:5:75) | 4.28→4.15 | 75 | 86 |

As is apparent from the results, each of the non-aqueous electrolyte secondary batteries of Examples 7 and 8 which utilized the mixed solvent containing 4-fluoroethylene carbonate having decomposition potential in the range of +1.0 to 3.0 V based on the equilibrium potential between metal lithium and lithium ion and chain fluorinated carboxylic acid ester represented by the above formula (1) exhibited more improvement in battery voltage as well as percentage of residual capacity after storage as compared with the non-aqueous electrolyte secondary battery of Comparative Example 8 which utilized ethyl methyl carbonate (EMC) instead of chain fluorinated carboxylic acid ester represented by the above formula (1).

Especially, the non-aqueous electrolyte secondary battery of Examples 7 which utilized methyl 3,3,3-trifluoropropionate $CF_3CH_2COOCH_3$ as chain fluorinated carboxylic acid ester represented by the above formula (1) exhibited further improvement in percentage of residual capacity (%) as well as percentage of recovery capacity (%) after storage.

BRIEF DESCRIPTION OF THE DRAWINGS

The FIG. 1 is a schematic cross-sectional view of a non-aqueous electrolyte secondary battery fabricated in Examples 1 to 8 and Comparative Examples 1 to 8 of the present invention.

DESCRIPTION OF REFERENCE NUMERALS 1 positive electrode
2 negative electrode
3 separator
4 battery can
5 positive electrode tub
6 positive electrode cover
7 negative electrode tub
8 insulation packing
9 positive electrode external terminal

What is claimed is:
1. A non-aqueous electrolyte for secondary battery comprising a non-aqueous solvent dissolving lithium salt as an electrolyte,
wherein said non-aqueous solvent contains:
(A) methyl 3,3,3-trifluoropropionate represented by the below formula (1);

$$CF_3\text{—}CH_2\text{—}COO\text{—}CH_3 \qquad (1)$$

and
(B) a film-forming chemical compound decomposed in the range of +1.0 to 3.0 V based on an equilibrium potential between metal lithium and lithium ion;
wherein said film-forming chemical compound is at least one selected from the group consisting of 4-fluoroethylene carbonate, ethylene sulfite, vinyl ethylene carbonate, $LiB(C_2O_4)_2$, and $LiBF_2(C_2O_4)$;
wherein said non-aqueous solvent further contains at least one low viscosity solvent selected from a group of $CH_3COOCH_3$, $C_2H_5COOCH_3$, $CH_3COOC_2H_5$, and $CH_3OCOOCH_3$;
wherein the amount of said methyl 3,3,3-trifluoropropionate is in the range of 20 to 90 volume % to the whole amount of non-aqueous solvent; and
wherein the amount of said 4-fluoroethylene carbonate to the whole amount of non-aqueous solvent is 2-40 volume %, the amount of said ethylene sulfite and said vinyl ethylene carbonate to the whole amount of non-aqueous solvent is 0.1-10 wt %, and the amount of said LiB$(C_2O_4)_2$ and said LiBF$_2(C_2O_4)$ to the whole amount of non-aqueous solvent is 0.01-0.4 mol/l.

2. The non-aqueous electrolyte for secondary battery as claimed in claim 1, wherein said film-forming chemical compound is 4-fluoroethylene carbonate.

3. The non-aqueous electrolyte for secondary battery as claimed in claim 1, wherein said film-forming chemical compound is 4-fluoroethylene carbonate and the amount of the 4-fluoroethylene carbonate is in the range of 5 to 30 volume % to the whole amount of non-aqueous solvent.

4. A non-aqueous electrolyte secondary battery comprising a positive electrode, a negative electrode, a separator, and a non-aqueous electrolyte,
wherein said non-aqueous electrolyte comprises a non-aqueous solvent dissolving lithium salt as an electrolyte;
wherein said non-aqueous solvent contains:
(A) methyl 3,3,3-trifluoropropionate represented by the below formula (1);

$$CF_3\text{—}CH_2\text{—}COO\text{—}CH_3 \qquad (1)$$

and
(B) a film-forming chemical compound decomposed in the range of +1.0 to 3.0 V based on an equilibrium potential between metal lithium and lithium ion;
wherein said film-forming chemical compound is at least one selected from a group consisting of 4-fluoroethylene carbonate, ethylene sulfite, vinyl ethylene carbonate, $LiB(C_2O_4)_2$, and $LiBF_2(C_2O_4)$; and
wherein said non-aqueous solvent further contains at least one low viscosity solvent selected from a group of $CH_3COOCH_3$, $C_2H_5COOCH_3$, $CH_3COOC_2H_5$, and $CH_3OCOOCH_3$;
wherein the amount of said methyl 3,3,3-trifluoropropionate is in the range of 20 to 90 volume % to the whole amount of non-aqueous solvent and
wherein the amount of said 4-fluoroethylene carbonate to the whole amount of non-aqueous solvent is 2-40 volume %, the amount of said ethylene sulfite and said vinyl ethylene carbonate to the whole amount of non-aqueous solvent is 0.1-10 wt %, and the amount of said LiB$(C_2O_4)_2$ and said LiBF$_2(C_2O_4)$ to the whole amount of non-aqueous solvent is 0.01-0.4 mol/l.

5. The non-aqueous electrolyte secondary battery as claimed in claim 4, wherein said film-forming chemical compound is 4-fluoroethylene carbonate.

6. The non-aqueous electrolyte secondary battery as claimed in claim 4, wherein said film-forming chemical compound is 4-fluoroethylene carbonate and the amount of the 4-fluoroethylene carbonate is in the range of 5 to 30 volume % to the whole amount of non-aqueous solvent.

7. The non-aqueous electrolyte secondary battery as claimed in claim 4 which is charged until a potential of the positive electrode becomes 4.35 V or more based on metal lithium.

8. A non-aqueous electrolyte for secondary battery comprising a non-aqueous solvent dissolving lithium salt as an electrolyte,
wherein said non-aqueous solvent contains:
(A) methyl 3,3,3-trifluoropropionate represented by the below formula (1);

$$CF_3\text{—}CH_2\text{—}COO\text{—}CH_3 \qquad (1)$$

and
(B) a film-forming chemical compound decomposed in the range of +1.0 to 3.0 V based on an equilibrium potential between metal lithium and lithium ion;

wherein said film-forming chemical compound is at least one selected from the group consisting of 4-fluoroethylene carbonate, ethylene sulfite, vinyl ethylene carbonate, LiB(C$_2$O$_4$)$_2$, and LiBF$_2$(C$_2$O$_4$); and wherein the amount of said methyl 3,3,3-trifluoropropionate is in the range of 20 to 90 volume % to the whole amount of the non-aqueous solvent; and wherein the amount of said 4-fluoroethylene carbonate to the whole amount of non-aqueous solvent is 2-40 volume %, the amount of said ethylene sulfite and said vinyl ethylene carbonate to the whole amount of non-aqueous solvent is 0.1-10 wt %, and the amount of said LiB(C$_2$O$_4$)$_2$ and said LiBF$_2$(C$_2$O$_4$) to the whole amount of non-aqueous solvent is 0.01-0.4 mol/l.

9. The non-aqueous electrolyte for secondary battery as claimed in claim 8, wherein the lithium salt main comprises LiPF$_6$.

10. The non-aqueous electrolyte for secondary battery as claimed in claim 8, wherein said film-forming chemical compound is 4-fluoroethylene carbonate.

11. The non-aqueous electrolyte for secondary battery as claimed in claim 8, wherein said film-forming chemical compound is 4-fluoroethylene carbonate and the amount of the 4-fluoroethylene carbonate is in the range of 5 to 30 volume % to the whole amount of non-aqueous solvent.

12. A non-aqueous electrolyte secondary battery comprising a positive electrode, a negative electrode, a separator, and a non-aqueous electrolyte, wherein said non-aqueous electrolyte comprises a non-aqueous solvent dissolving lithium salt as an electrolyte;

wherein said non-aqueous solvent contains:

(A) methyl 3,3,3-trifluoropropionate represented by the below formula (1);

$$CF_3-CH_2-COO-CH_3 \qquad (1)$$

and (B) a film-forming chemical compound decomposed in the range of +1.0 to 3.0 V based on an equilibrium potential between metal lithium and lithium ion;

wherein said film-forming chemical compound is at least one selected from a group consisting of 4-fluoroethylene carbonate, ethylene sulfite, vinyl ethylene carbonate, LiB(C$_2$O$_4$)$_2$, and LiBF$_2$(C$_2$O$_4$); and wherein the amount of said methyl 3,3,3-trifluoropropionate is in the range of 20 to 90 volume % to the whole amount of the non-aqueous solvent; and wherein the amount of said 4-fluoroethylene carbonate to the whole amount of non-aqueous solvent is 2-40 volume %, the amount of said ethylene sulfite and said vinyl ethylene carbonate to the whole amount of non-aqueous solvent is 0.1-10 wt %, and the amount of said LiB(C$_2$O$_4$)$_2$ and said LiBF$_2$(C$_2$O$_4$) to the whole amount of non-aqueous solvent is 0.01-0.4 mol/l.

13. The non-aqueous electrolyte secondary battery as claimed in claim 12, wherein the lithium salt main comprises LiPF$_6$.

14. The non-aqueous electrolyte secondary battery as claimed in claim 12, wherein said film-forming chemical compound is 4-fluoroethylene carbonate.

15. The non-aqueous electrolyte secondary battery as claimed in claim 12, wherein said film-forming chemical compound is 4-fluoroethylene carbonate and the amount of the 4-fluoroethylene carbonate is in the range of 5 to 30 volume % to the whole amount of non-aqueous solvent.

16. The non-aqueous electrolyte secondary battery as claimed in claim 12 which is charged until a potential of the positive electrode becomes 4.35 V or more based on metal lithium.

* * * * *